United States Patent
Vargo et al.

(10) Patent No.: US 6,497,834 B1
(45) Date of Patent: Dec. 24, 2002

(54) METHOD OF MAKING A FLOW CHANNEL BLOCK

(75) Inventors: Richard David Vargo, Stow, OH (US); Gary Robert Burg, Canton, OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 09/744,095

(22) PCT Filed: Apr. 21, 1998

(86) PCT No.: PCT/US98/07971

§ 371 (c)(1),
(2), (4) Date: Jan. 15, 2001

(87) PCT Pub. No.: WO99/54107

PCT Pub. Date: Oct. 28, 1999

(51) Int. Cl.[7] ............................................. B29C 33/38
(52) U.S. Cl. .................... 264/219; 29/530; 264/162; 264/225; 264/317
(58) Field of Search ................ 264/317, 219, 264/162, 225; 29/530

(56) References Cited

U.S. PATENT DOCUMENTS

| | | | | |
|---|---|---|---|---|
| 3,491,184 A | * | 1/1970 | Rietdijk | 264/317 |
| 3,617,369 A | | 11/1971 | Lombardo | |
| 3,882,220 A | * | 5/1975 | Ryder | 264/317 |
| 3,983,193 A | | 9/1976 | Wulker et al. | 264/36 |
| 4,133,369 A | * | 1/1979 | Maire et al. | 264/317 |
| 4,185,056 A | | 1/1980 | Detwiler | 264/36 |
| 4,343,757 A | * | 8/1982 | Popplewell | 264/317 |
| 4,353,850 A | * | 10/1982 | MacDonald | 264/317 |
| 4,444,607 A | | 4/1984 | Lash et al. | 156/58 |
| 4,474,722 A | | 10/1984 | Martin | 264/219 |
| 4,500,375 A | | 2/1985 | Goldstein | 156/96 |
| 4,517,247 A | * | 5/1985 | Suzuki et al. | 264/317 |
| 4,571,277 A | | 2/1986 | Goldstein | 156/96 |
| 4,590,026 A | * | 5/1986 | Goto | 264/317 |
| 4,858,881 A | | 8/1989 | Alloway | 249/135 |
| 5,057,258 A | | 10/1991 | Scuri | 264/138 |
| 5,178,976 A | | 1/1993 | Rose et al. | 430/5 |
| 5,449,483 A | | 9/1995 | Greenwood et al. | 264/155 |
| 5,520,871 A | * | 5/1996 | Rosenberg et al. | 264/317 |
| 5,614,143 A | * | 3/1997 | Hager | 264/317 |
| 5,975,189 A | * | 11/1999 | Nemoto | 264/317 |

FOREIGN PATENT DOCUMENTS

| | | | | |
|---|---|---|---|---|
| DE | 19529077.1 | 2/1997 | | B29C/47/78 |
| GB | 2089720 | 6/1982 | | B29C/1/06 |

* cited by examiner

*Primary Examiner*—Allan R. Kuhns
(74) *Attorney, Agent, or Firm*—Frederick K. Lacher, Esq.; Bruce J. Hendricks, Esq.; The Goodyear Tire & Rubber Co.

(57) ABSTRACT

Changing the contour of a recess (12) in a body of solid material to a revised contour wherein a pattern (24) is made having the revised contour and this pattern is placed in the recess with a curable plastic material (31). After the curable plastic material is hardened, the pattern is removed providing the revised contour (30) of the recess. The body of solid material can be a flow channel block.

7 Claims, 4 Drawing Sheets

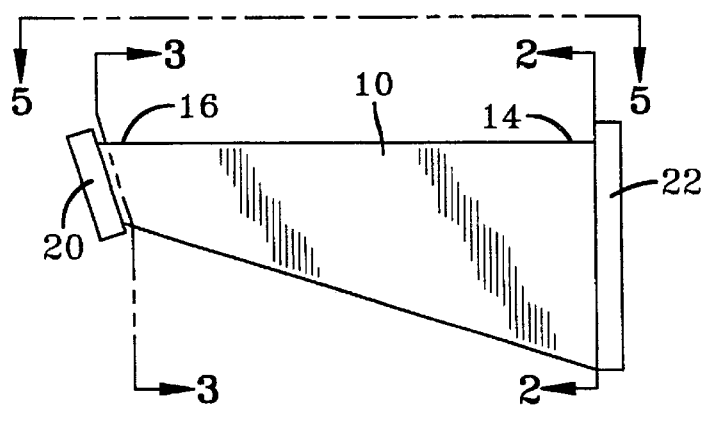
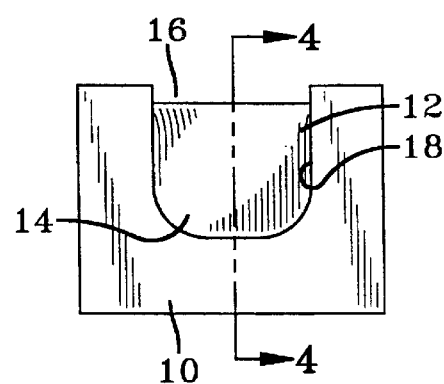
FIG-1
FIG-2
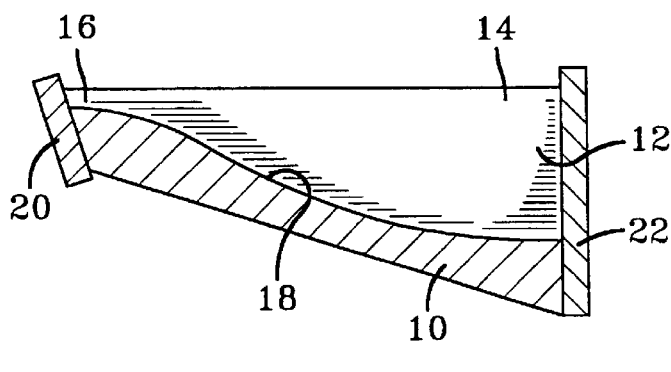
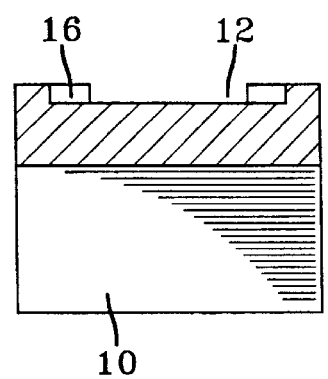
FIG-4
FIG-3
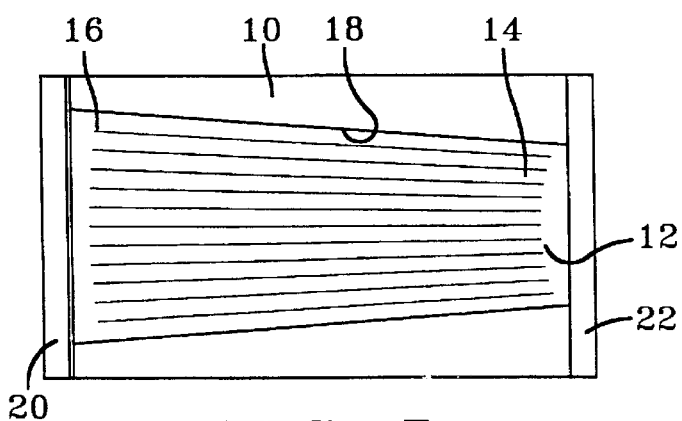
FIG-5

METHOD OF MAKING A FLOW CHANNEL BLOCK

TECHNICAL FIELD

This invention relates to experimental flow channel blocks and the method of making inserts of curable plastic material to change the size and shape of the flow channels.

BACKGROUND ART

In the design and production of experimental flow channel blocks and other metal components the optimum contour of the flow channel has been provided by cut and try machining. This is an expensive and time consuming process. Machining metal inserts to change the flow channel contour has also not been satisfactory because of the time required and the difficulty in machining the inserts to fit in the flow channels. Utilizing a curable plastic material to produce a tire mold is disclosed in U.S. Pat. No. 5,449,483 where the plastic is used as a resin backing for a reinforced shell formed on a model. Also in U.S. Pat. No. 4,858,881, a tire mold surface is provided by pouring an epoxy over a tire sidewall in a mold box. Patterns have also been used in making molds for casting metal products, however, none of these methods have suggested an inexpensive method of modifying a flow channel to determine the optimum contour for the flow of extrudates, especially those used for tire components.

DISCLOSURE OF INVENTION

The present invention is directed to a method of providing a flow channel of the optimum size and shape in a metal flow channel block with a minimum cost and in a short period of time. The existing flow channel in the flow channel block is filled with a blank of an easily machinable material, such as machinable wax. This blank hardens and after removal from the flow channel recess may be easily machined to provide a pattern having a size and shape believed to have the optimum contour for a particular operation. A release agent may be applied to the pattern which may then be placed in the flow channel with a thermally conductive epoxy casting resin. After the epoxy is cured and hardened to form an insert, the pattern is removed. The blank may also be an easily machinable block of material of a different shape than the flow channel.

In accordance with one aspect of the invention, there is provided a method of changing the contour of a first recess in a body of solid material to provide a second recess characterized by;
  (a) shaping a pattern having the size and shape of the second recess,
  (b) placing the pattern and a curable plastic material in the first recess,
  (c) hardening the curable plastic material to form an insert; and
  (d) removing the pattern from the insert to form the second recess.

In accordance with another aspect of the invention, there is provided a flow channel block having a first recess characterized by an insert of curable plastic material in said first recess, a second recess in said insert providing a flow channel having a revised contour and being formed by a pattern placed in said first recess with said curable plastic material of said insert in a plastic condition and removed after hardening of said curable plastic material.

BRIEF DESCRIPTION OF DRAWINGS

FIG. 1 is a schematic elevation of a flow channel block having a flow channel or first recess with the ends of the flow channel closed with end plate dams.

FIG. 2 is an end view taken along line 2—2 in FIG. 1.

FIG. 3 is another end view of the flow channel block taken along line 3—3 in FIG. 1.

FIG. 4 is a sectional view taken along line 4—4 in FIG. 2.

FIG. 5 is a plan view taken along line 5—5 in FIG. 1.

DETAILED DESCRIPTION OF THE INVENTION

Figure 6:
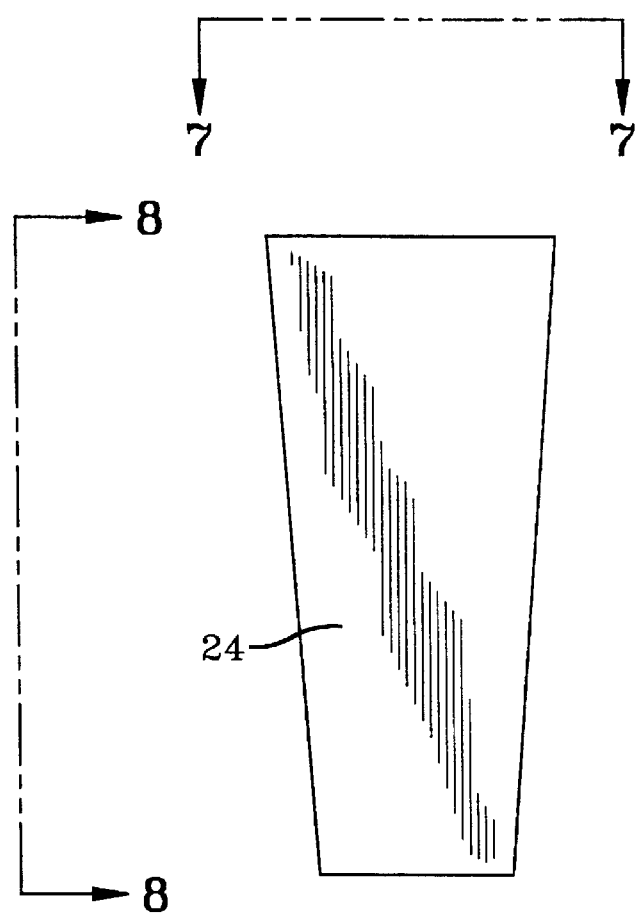
FIG. 6 is a plan view of a blank made by filling the recess in the flow channel block with a machinable material.

Referring to FIGS. 1–5, a body of solid material, such as flow channel block 10, which may be of steel or other durable material is shown. A flow channel, hereinafter referred to as a first recess 12 is cast or machined with an entry end 14 and an exit end 16. The first recess 12 has a surface 18 with a contour for changing the flow of an extrudate from the relatively round cross section at the entry end 14 to the relatively flat rectangular section at the exit end 16 as shown in FIGS. 2 and 3.

Dam members, such as closure plates 20 and 22, may be mounted at the ends 14 and 16 to enclose the space surrounded by the surface 18 of the first recess 12.

Figure 8:
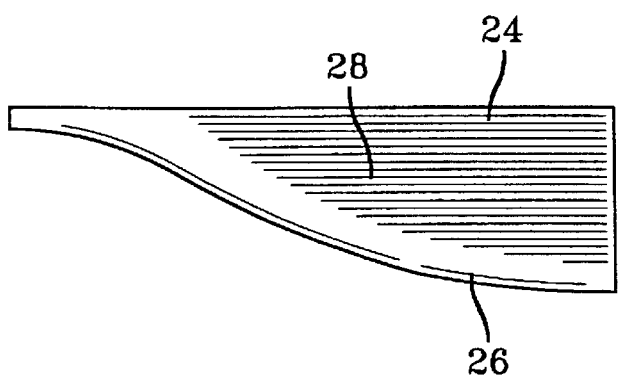
FIG. 8 is a side view of the blank taken along line 8—8 in FIG. 6.
Figure 7:
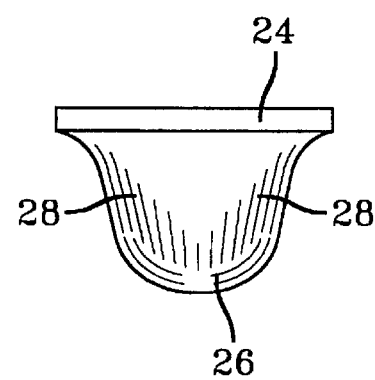
FIG. 7 is an end view of the blank taken along line 7—7 in FIG. 6.

In accordance with the method of this invention, the first recess 12 is filled with a substance such as machinable wax to provide a temporary casting or blank 24 of the first recess. The most desirable material should have a low shrinkage upon setting. A release agent may be needed to release the cast parts, such as the blank 24, shown in FIGS. 6, 7 and 8, from the flow channel block 10 after cooling of the wax.

Figure 9:
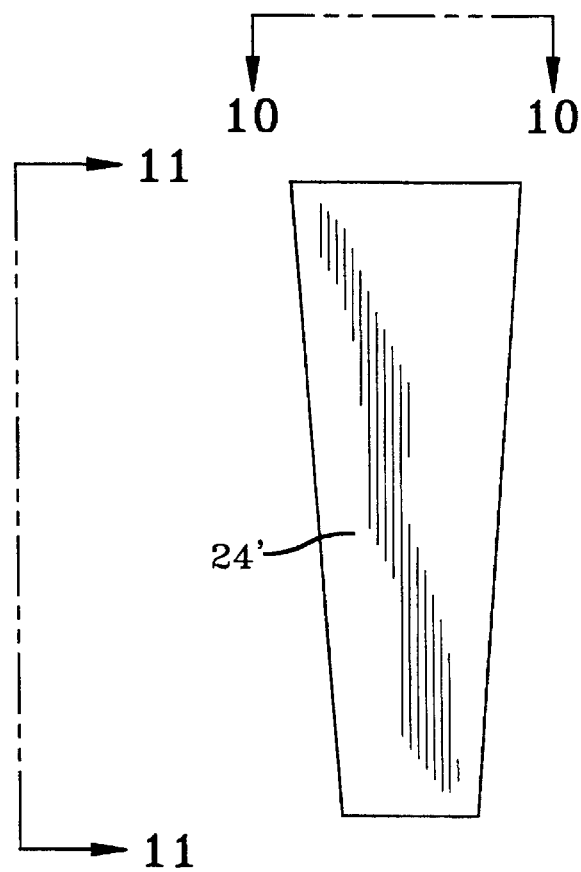
FIG. 9 is a view like FIG. 6 showing the blank after shaping to a new flow channel contour.
Figure 11:
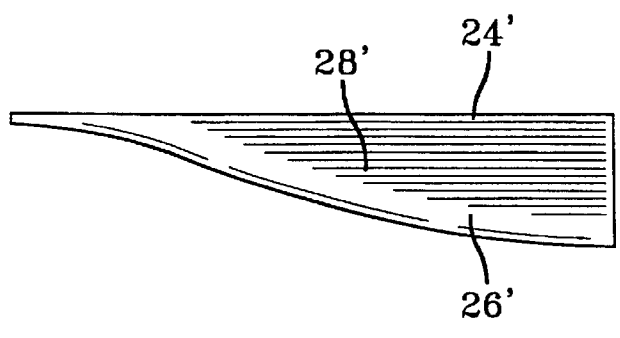
FIG. 11 is a side view like FIG. 8 taken along line 11—11 in FIG. 9.
Figure 10:
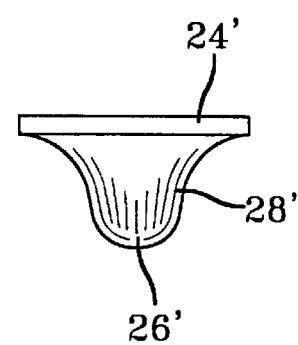
FIG. 10 is an end view like FIG. 7 taken along line 10—10 in FIG. 9.
Figure 12:
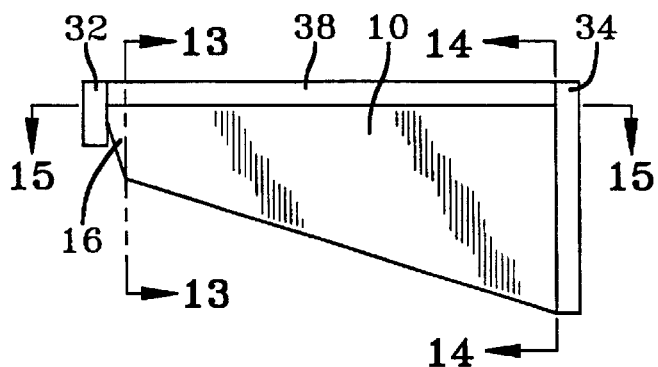
FIG. 12 is an elevation of the flow channel block shown in FIG. 1 with the end plate dams and a cover plate installed and with the formed blank shown in FIGS. 9, 10 and 11 placed in the flow channel. The curable plastic material is shown interposed between the blank and the surface of the flow channel to form the second recess having the changed contour.
Figure 14:
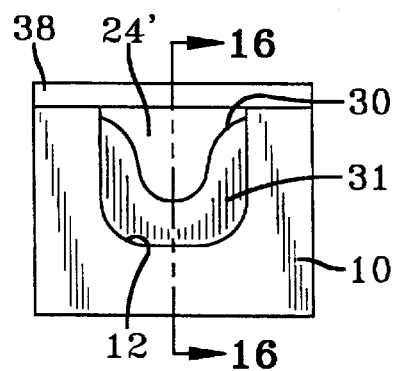
FIG. 14 is an end view taken along line 14—14 in FIG. 12.
Figure 16:
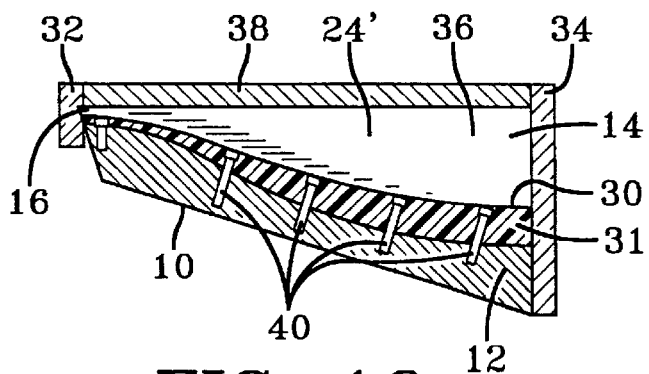
FIG. 16 is a sectional view taken along line 16—16 in FIG. 14.
Figure 13:
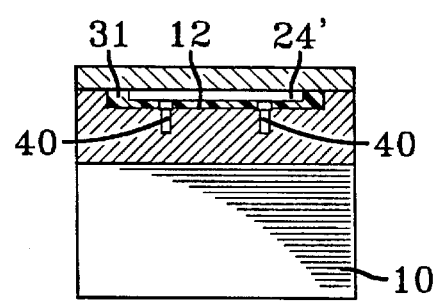
FIG. 13 is a sectional view taken along line 13—13 in FIG. 12.
Figure 15:
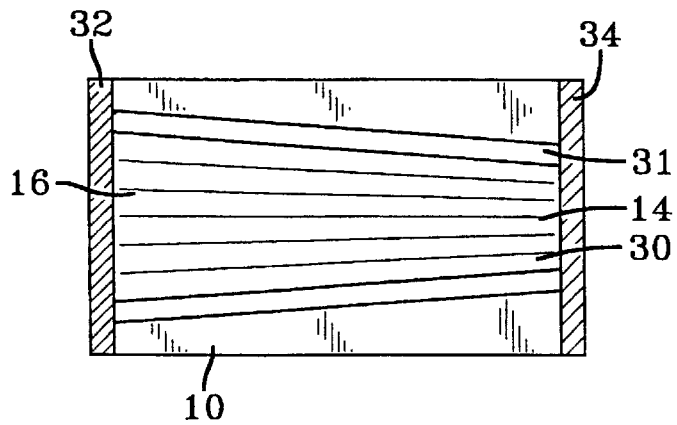
FIG. 15 is a plan view taken along line 15—15 in FIG. 12.

As shown in FIGS. 9, 10 and 11, the blank 24 may be machined to a desired new contour, providing a machined blank 24' having material removed from the bottom surface 26 and side surfaces 28 of the blank 24, providing revised bottom surfaces 26' and revised side surfaces 28', as shown in FIGS. 10 and 11.

The pattern provided by the machined blank 24' may also be provided by forming a blank of clay or other easily moldable material which does not require machining.

Referring to FIGS. 13, 14, 15 and 16, the machined blank 24', which has been machined to provide a pattern for a second recess 30 is placed in the first recess 12 and a curable plastic material 36 is placed in the first recess 12 with the machined blank 24' to form an insert 31 with the second recess in the form of a channel 30 shown in FIGS. 13, 14, 15 and 16.

The curable plastic material 36 may be in a fluid form, which requires the machined blank 24' to be held in position with a cover plate 38 to which the blank may be screwed, or the material may be in a plastic state, so that the machined blank 24' may be pressed into position and held there by the plastic material.

A suitable curable plastic material may be a room temperature castable epoxy resin which is thermally conductive with low shrinkage and medium viscosity. Hardeners are preferably used with the epoxy resin.

After the insert 31 of curable plastic material has hardened at room temperature, the machined blank 24' or pattern of other material may be removed, and according to a recommended cure schedule, the finished epoxy insert 31 with the second recess 30 is then mounted in the first recess 12 and may be held in place by bolts 40, threaded in the wall of the flow channel block first recess 12. The flow channel block 10 may then be installed for experimental operation with the revised flow channel 30 of the second recess. If this revised flow channel 30 proves satisfactory, a permanent flow channel block having the revised contour may be made of steel for production purposes.

While a certain representative embodiment and details have been shown for the purpose of illustrating the invention, it will be apparent to those skilled in the art that various changes and modifications may be made therein without departing from the scope of the invention.

Having thus described the invention, it is now claimed:

1. A method of changing the contour of a first recess in a body of solid material to provide a second recess with a revised contour characterized by;
   (a) shaping a pattern having the size and shape of said second recess,
   (b) placing said pattern and a curable plastic material in a plastic condition in said first recess,
   (c) hardening said curable plastic material to form an insert;
   (d) removing said pattern from said insert to form said second recess;
   (e) removing said curable plastic material from said first recess after it is formed into said insert;
   (f) curing said insert;
   (g) replacing said insert in said first recess and;
   (h) fastening said first insert to said body of solid material.

2. The method of claim 1 further characterized by partially filling said first recess with said curable plastic material in a plastic condition before placing said pattern in said first recess.

3. The method of claim 1 further characterized by shaping said pattern by forming a blank having the size and shape of said first recess and then machining said blank to the size and shape of said second recess.

4. The method of claim 1 wherein said first recess is a flow channel in said surface and extends between opposite ends of said body further characterized by closing said flow channel at said opposite ends by dams to contain said curable plastic material.

5. The method of claim 1 further characterized by forming said pattern from a moldable material.

6. The method of claim 5 further characterized by said moldable material being clay.

7. The method of claim 3 further characterized by said blank for said pattern being of machinable wax and including the steps of pouring said wax into said first recess, solidifying said wax, and then removing said blank from said first recess after it is hardened.

* * * * *